(12) United States Patent
Conley et al.

(10) Patent No.: US 7,634,585 B2
(45) Date of Patent: Dec. 15, 2009

(54) IN-LINE CACHE USING NONVOLATILE MEMORY BETWEEN HOST AND DISK DEVICE

(75) Inventors: Kevin M. Conley, San Jose, CA (US); E. Earle Thompson, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/267,534

(22) Filed: Nov. 4, 2005

(65) Prior Publication Data

US 2007/0168564 A1    Jul. 19, 2007

(51) Int. Cl.
| | |
|---|---|
| G06F 3/00 | (2006.01) |
| G06F 5/00 | (2006.01) |
| G06F 13/42 | (2006.01) |
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |
| G06F 11/30 | (2006.01) |
| G06F 12/14 | (2006.01) |
| G06F 1/26 | (2006.01) |
| G06F 1/32 | (2006.01) |
| G06F 1/00 | (2006.01) |

(52) U.S. Cl. .............. 710/1; 710/52; 710/105; 711/113; 711/118; 711/202; 713/193; 713/320; 713/340

(58) Field of Classification Search ............ 711/118, 711/113, 202; 710/52, 105; 713/193, 320, 713/340
See application file for complete search history.

(56) References Cited

U.S. PATENT DOCUMENTS

| | | | |
|---|---|---|---|
| 5,021,983 A | * | 6/1991 | Nguyen et al. ............ 713/321 |
| 5,043,940 A | | 8/1991 | Harari .................. 365/185.03 |
| 5,172,338 A | | 12/1992 | Mehrotra et al. ........ 365/185.03 |

(Continued)

FOREIGN PATENT DOCUMENTS

EP    0702305 A1    3/1996

(Continued)

OTHER PUBLICATIONS

Daniel Elmhurst and Matthew Goldman, A 1.8-V 128-Mb 125-MHz Multilevel Cell Flash Memory With Flexible Read While Write, IEEE Journal of Solid-State Circuits, vol. 38, No. 11, Nov. 2003.*

(Continued)

Primary Examiner—Henry W. H. Tsai
Assistant Examiner—Kris Rhu
(74) Attorney, Agent, or Firm—Weaver Austin Villeneuve Sampson LLP

(57) ABSTRACT

A memory module is interposed between a host and a disk drive. The memory module includes a solid-state nonvolatile memory used for caching data sent by the host for storage in the disk drive. Caching takes place under the control of a memory controller in the memory module and may be transparent to the host. The disk drive may remain spun-down when data is cached, saving power. The destination for host data may be determined based on desired speed, power consumption and expected need for that data. A host may send specific commands to the memory module to enable additional functions.

19 Claims, 7 Drawing Sheets

U.S. PATENT DOCUMENTS

| | | | |
|---|---|---|---|
| 5,200,959 A | 4/1993 | Gross et al. | 714/723 |
| 5,270,979 A | 12/1993 | Harari et al. | 365/185.09 |
| 5,315,541 A | 5/1994 | Harari et al. | 365/185.13 |
| 5,428,621 A | 6/1995 | Mehrotra et al. | 714/721 |
| 5,430,859 A | 7/1995 | Norman et al. | 711/103 |
| 5,532,962 A | 7/1996 | Auclair et al. | 365/201 |
| 5,542,066 A | 7/1996 | Mattson et al. | |
| 5,566,315 A | 10/1996 | Milillo et al. | |
| 5,586,291 A | 12/1996 | Lasker et al. | |
| 5,602,987 A | 2/1997 | Harari et al. | 714/8 |
| 5,636,355 A | 6/1997 | Ramakrishnan et al. | |
| 5,663,901 A | 9/1997 | Wallace et al. | 365/52 |
| 5,712,180 A | 1/1998 | Guterman et al. | 438/263 |
| 5,926,834 A * | 7/1999 | Carlson et al. | 711/152 |
| 5,930,167 A | 7/1999 | Lee et al. | 365/185.03 |
| 6,016,530 A | 1/2000 | Auclair et al. | |
| 6,151,248 A | 11/2000 | Harari et al. | 365/185.14 |
| 6,222,762 B1 | 4/2001 | Guterman et al. | 365/185.03 |
| 6,594,731 B1 * | 7/2003 | Hertwig et al. | 711/137 |
| 6,725,342 B1 * | 4/2004 | Coulson | 711/103 |
| 6,763,424 B2 | 7/2004 | Conley | 711/103 |
| 7,012,835 B2 | 3/2006 | Gonzalez et al. | 365/185.11 |
| 7,139,864 B2 | 11/2006 | Bennett et al. | 711/103 |
| 2002/0083264 A1 | 6/2002 | Coulson | |
| 2003/0084245 A1 | 5/2003 | Tanaka et al. | 711/118 |
| 2003/0109093 A1 | 6/2003 | Harari et al. | 438/200 |
| 2003/0135674 A1 * | 7/2003 | Mason et al. | 710/74 |
| 2004/0012998 A1 | 1/2004 | Chien et al. | 365/185.2 |
| 2004/0039932 A1 | 2/2004 | Elazar et al. | 726/126 |
| 2004/0162950 A1 * | 8/2004 | Coulson | 711/141 |
| 2004/0174631 A1 | 9/2004 | Tanaka et al. | |
| 2004/0225835 A1 * | 11/2004 | Coulson | 711/114 |
| 2005/0003616 A1 | 1/2005 | Lutze et al. | 438/258 |
| 2005/0071561 A1 * | 3/2005 | Olsen et al. | 711/118 |
| 2005/0138551 A1 | 6/2005 | Elazar et al. | 715/525 |
| 2005/0172074 A1 | 8/2005 | Sinclair | |
| 2006/0010500 A1 | 1/2006 | Elazar et al. | 726/27 |
| 2006/0018484 A1 * | 1/2006 | Yoshihiro et al. | 380/277 |
| 2006/0146373 A1 | 7/2006 | Corrion | 358/474 |
| 2006/0184717 A1 | 8/2006 | Rothman et al. | 711/103 |
| 2006/0184718 A1 | 8/2006 | Sinclair et al. | 711/103 |
| 2006/0184719 A1 | 8/2006 | Sinclair | 711/103 |
| 2006/0184720 A1 | 8/2006 | Sinclair et al. | 711/103 |
| 2006/0248387 A1 * | 11/2006 | Nicholson et al. | 714/22 |
| 2007/0033362 A1 | 2/2007 | Sinclair | 711/165 |
| 2007/0106842 A1 | 5/2007 | Conley et al. | 711/113 |

FOREIGN PATENT DOCUMENTS

| | | |
|---|---|---|
| EP | 0564699 A1 | 12/1998 |
| EP | 0978040 B1 | 5/2004 |
| JP | 6236241 | 8/1994 |
| JP | 6314177 | 11/1994 |
| WO | WO 0201365 A2 * | 1/2002 |
| WO | WO 2007/056669 A2 | 7/2007 |

OTHER PUBLICATIONS

U.S. Appl. No. 60/705,388, filed Aug. 3, 2005, Sinclair.

European Patent Office/International Searching Authority, "Notification of Transmittal of the International Search Report and the Written Opinion of the International Searching Authority, or the Declaration", mailed in corresponding International Application No. PCT/US/2006/060490 (published as WO 2007/056669 A2) on Jul. 31, 2007, 20 pages.

Jim Handy, "The Cache Memory Book", Academic Press, $2^{nd}$ Edition, 1998, pp. 7-8.

John L. Hennessy et al., Computer Architecture, A Quantitative Approach, Morgan Kaufmann Publishers, $3^{rd}$ Edition, 2003, pp. 682-683, 690-691.

USPTO, Office Action, mailed Oct. 19, 2007 in related U.S. Appl. No. 11/267,444, 14 pages.

USPTO, Final Office Action, mailed May 27, 2008 in related U.S. Appl. No. 11/267,444, 22 pages.

* cited by examiner

IN-LINE CACHE USING NONVOLATILE MEMORY BETWEEN HOST AND DISK DEVICE

CROSS-REFERENCE TO RELATED APPLICATIONS

This application is related to U.S. patent application Ser. No. 11/267,444, entitled, "Enhanced First Level Storage Caching Methods Using Nonvolatile Memory," filed on the same day as the present application.

BACKGROUND

This invention relates to solid-state nonvolatile memories and in particular, the use of such memories with disk drives to provide improved memory systems.

Disk drives are commonly used as mass data storage devices. Host systems such as Personal Computers (PCs) may have one or more Hard Disk Drives (HDDs) connected so that data may be sent from the host system to the HDD and later retrieved from the HDD. The data is stored in the HDD in a digital format where bits of data are represented by the magnetic orientation of portions of a layer of a magnetic medium on a disk generally referred to as a "platter." Typically multiple platters are used in a single HDD. The platters rotate at high speed (such as 7200 rpm) and an arm moves read/write heads over platters to access data. HDDs have certain limitations because of their physical structure. Because the platters must rotate, power consumption may be higher than desired. The moving parts are susceptible to damage from shock, such as from dropping the device. Moving parts may also cause failure after an undesirably short period of time due to mechanical wear of parts that are in frictional contact as the platters rotate. Access times may be undesirably slow because of the latency due to moving the read/write head and platter to the appropriate positions before accessing a particular location. In particular, when a read or write command is received by an idle HDD, the platter may be stationary. It is then necessary to spin-up the HDD (rotate the platters at a predetermined speed) before executing the command, causing a considerable delay. Even if the platters are spinning, moving the head to the appropriate position may take significant time.

Solid-state nonvolatile memories provide an alternative form of data storage for certain applications. Solid-state memories do not have moving parts and may therefore use less power and be made to have a longer working life than HDDs. Also, because access to particular data does not require moving parts to the appropriate positions, solid-state memories typically have faster access times. Solid-state memories have no requirement to spin up before data may be accessed. Thus, their access time is generally faster and more consistent than that of a HDD, which can vary considerably depending on the position of the head and whether the platters are spinning. One example of a solid-state nonvolatile memory is an Electrically Erasable Read Only Memory (EEPROM). A block-erasable flash EEPROM is a common example of an EEPROM. Systems employing flash EEPROM have been commercially successful in the form of removable memory cards, such as CompactFlash™ (CF) cards, MultiMedia cards (MMC), Secure Digital (SD) cards, SmartMedia cards, personnel tags (P-Tag) and Memory Stick cards. Flash EEPROM is also widely used in embedded applications.

Flash memory systems include an array of floating-gate memory cells and a memory controller. The memory controller manages communication with the host system and operation of the memory cell array to store and retrieve user data. The memory cells are grouped together into blocks of cells, a block of cells being the smallest grouping of cells that are simultaneously erasable. Prior to writing data into one or more blocks of cells, those blocks of cells are erased. User data are typically transferred between the host and the memory in sectors. A sector of user data can be any amount that is convenient to handle, preferably less than the capacity of the memory block, often being equal to the standard disk drive sector size, 512 bytes. In one commercial architecture, the memory system block is sized to store one sector of user data plus overhead data, the overhead data including information such as an error correction code (ECC) for the user data stored in the block, a history of use of the block, defects and other physical information of the memory cell block. Various implementations of non-volatile memory system are described in the following United States patents and pending applications assigned to SanDisk Corporation: U.S. Pat. Nos. 5,172,338, 5,602,987, 5,315,541, 5,200,959, 5,270,979, 5,428,621, 5,663,901, 5,532,962, 5,430,859 and 5,712,180, 6,222,762 and 6,151,248. These patents, along with all other patents, patent applications or documents referred to in this application are hereby incorporated by reference in their entirety for all purposes.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of memory systems are found in U.S. Published applications 20040012998A1 and 20050003616A1, which applications are hereby incorporated in their entirety by this reference.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a nonvolatile manner. A triple layer dielectric formed of silicon oxide, silicon nitride and silicon oxide (ONO) is sandwiched between a conductive control gate and a surface of a semiconductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described in U.S. patent application publication No. 2003/0109093 of Harari et al.

Solid-state nonvolatile memories generally have dedicated controllers that manage data storage in the nonvolatile memory array. The controller may be formed on the same chip as the memory array or on a different chip. Such a controller typically includes a microprocessor, read-only memory (ROM), random-access memory (RAM) and specialized circuits such as those responsible for performing Error Correction Code (ECC) functions.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips.

Although it is currently common to store one bit of data in each floating gate cell by defining only two programmed threshold levels, it is becoming increasingly common to store more than one bit of data in each cell by establishing more than two floating-gate transistor threshold ranges. A memory system that stores two bits of data per floating gate (four threshold level ranges or states) is currently available. Such memories may be referred to as Multi Level Cell (MLC) memories. Of course, the number of memory cells required to store a sector of data goes down as the number of bits stored in each cell goes up. Generally, in such systems, a block holds many sectors of data. A block may comprise one or more rows of a memory array, with each row storing multiple sectors of data. The block structure can also be formed to enable selection of operation of each of the memory cells in two states (one data bit per cell) or in some multiple such as four states (two data bits per cell). Multiple state flash EEPROM structures and their operation are described in U.S. Pat. Nos. 5,043,940, 5,172,338, 5,930,167 and 6,222,762, which patents are incorporated herein by this reference.

To further efficiently manage the memory, blocks may be linked together to form virtual blocks or metablocks. That is, each metablock is defined to include one block from each plane. Use of metablocks is described in U.S. Pat. No. 6,763,424, which is incorporated herein in its entirety. The metablock is identified by a host logical block address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. A metapage is a unit. of programming of data in a metablock. A metapage is comprised of one page from each of the blocks of the metablock.

Due to the difference in size between a sector (512 bytes) and an erase block or metablock (sometimes more than 128 sectors), it is sometimes necessary to consolidate sectors from one or more erase blocks, or metablocks, to another. Such an operation is referred to as garbage collection. Garbage collection operations reduce the write performance of a memory system. For example, where some sectors in a metablock are updated, but other sectors in the metablock are not, the updated sectors may be written to a new metablock. The sectors that are not updated may be copied to the new metablock, either immediately or at some later time as part of garbage collection. Examples of garbage collection operations are provided in U.S. Pat. No. 6,763,424 and U.S. patent application Ser. No. 10/750,155, which are both hereby incorporated by reference in their entirety. Another background operation that may be performed is a "Scrub" operation. This operation is performed to copy data that has threshold voltage levels outside a desired range and write the data with threshold voltages within the desired range. Such operations are described in U.S. patent application Ser. No. 10/678,345, which application is hereby incorporated by reference in its entirety.

Solid-state nonvolatile memories have several advantages over HDDs. However, solid-state memories generally cost more per unit of storage than HDDs and so HDDs are still commonly used for mass storage applications, particularly where large amounts of data are to be stored. Because of their low cost and high capacity, HDDs are likely to be used for some time to come. It is therefore desirable to improve the performance of HDDs, particularly to reduce power consumption, extend lifetime and increase speed.

Certain prior systems have combined HDDs and solid-state nonvolatile memories in order to improve memory performance. FIG. 1 shows an example of a disk drive system having a solid-state nonvolatile memory according to the prior art. In this system, the solid-state memory is incorporated into a HDD unit 120 and is under the control of a common controller 152. This allows common controller 152 to direct data from a host 154 to a solid-state nonvolatile memory 156 or directly to disk storage 158 as desired. This arrangement requires the addition of a solid-state nonvolatile memory 156 to HDD unit 150 and requires a controller that has additional functionality that is not usually present in such a controller. Thus, both hardware changes and software changes are needed in HDD unit 120 to implement this solution. Examples of HDDs that include a solid-state memory are provided by U.S. Pat. No. 6,016,530 by Auclair et al., which patent is hereby incorporated by reference in its entirety.

Therefore, there is a need for a memory system that improves HDD performance and may be implemented using existing HDD hardware and software. There is a particular need to improve HDD performance in the areas of power-consumption and lifetime. There is also a need for a module to improve HDD performance that may be added by an end-user without significant reconfiguration.

SUMMARY

A memory module inserted between a host and a HDD allows more efficient use of the HDD. In particular, when the HDD is spun-down, data sent by the host for storage in the HDD is intercepted by the memory module and is stored in a solid-state nonvolatile memory in the memory module. This allows the HDD to stay spun-down for extended periods of time, thus reducing power consumption and reducing wear on the HDD.

Physically, a detachable memory module may be formed to have approximately the same dimensions as a cable between the host and HDD. The detachable memory module has connectors at either end to allow it to be connected to the host and HDD. Upgrading a system to include such a detachable memory module may be as simple as replacing an existing cable with a detachable memory module that appears identical or similar to the cable it replaces. Memory circuits (memory array and controller) may be incorporated into one end of the cable where a connector is located. This may require a larger housing for the connector with the additional memory circuits. Alternatively, the memory circuits may be located along the cable at some intermediate point between connectors. Such a cable may form the only link between the host and HDD, or may be used as a dongle in series with another cable. Alternatively, a detachable memory module may have both connectors and the memory circuits in a single housing.

An alternative arrangement to the detachable memory module described above is an embedded memory module that is located within a host system, between the host microprocessor and the interface that connects to the HDD. Thus, the memory module is still in a location where it can intercept communication between the host microprocessor and the HDD. In one example, such an embedded memory module is located on a motherboard in a host system.

Several enhancements are possible using a memory module between the host and HDD. The memory module may provide a cache for read and write operations by the host. This reduces access to the HDD and may thereby reduce power consumption and improve speed. The caching policy may depend on a number of factors. The speed with which data may be stored is one important factor. However the speeds of the HDD and solid-state memories are not constant. A HDD that is not spinning may have a high latency whereas a HDD that is spun-up and has read/write heads appropriately positioned may be capable of very high-speed access. A solid-state memory does not have latency associated with spinning-up. However, if an erase operation is needed before storing additional data, this may make access relatively slow. Thus, the determination of which memory is faster is a dynamic determination and may be performed every time an access is required by the host, or may even be performed multiple times for a single host command.

Power-consumption is another key factor in deciding a caching policy. Power-consumption is particularly important for portable devices. However, the importance of power-consumption may depend on whether a device is plugged in or not and so it changes from time to time. A power-saving caching policy reduces spinning of the HDD. However, if, power-consumption is unimportant, then it may be preferred to keep the HDD spinning so that access to the HDD is more rapid.

When data is expected to be needed by the host again soon, it is preferable to keep the data in cache. This is another factor that may be taken into account in a caching scheme as part of improving overall speed.

While many benefits of a memory module may be realized without any modification to either the host or HDD and using a standard command set, additional benefits may be obtained by employing additional commands between the host and memory module. In particular, read and write commands may be specifically directed to the solid-state memory by the host. Thus, the host may choose the destination for particular data instead of having the memory controller choose the destination. The solid-state memory may be partitioned so that a partition is used as a cache and another partition is used for storage of data identified by the host. The host may also identify particular boot data to be loaded into solid-state memory so that the next time the host has to boot up, it does not have to wait for the HDD to spin-up before getting boot data. Commands may be associated with security features implemented in a memory module. Such security features may manage encryption and decryption of data in the memory module. Commands may also be associated with the compression and decompression of data in the memory module. Additional commands may identify a data management system used by the host. In some cases the memory module acts to translate between a data management system used by the host and a different data management system used by the HDD. Additional commands may be used as part of handshake routines or as part of a power-down routine.

DESCRIPTION OF EMBODIMENTS

Physical Description

Figure 1:
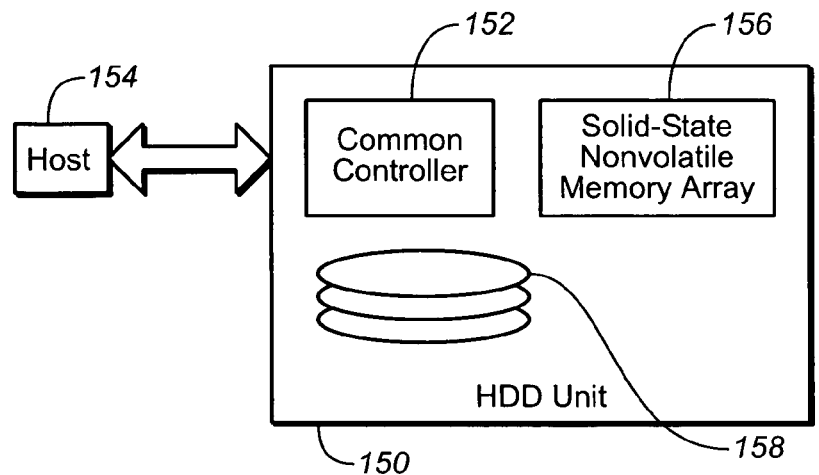
FIG. 1 shows a Hard Disk Drive (HDD) with solid-state nonvolatile memory array of the prior art.
Figure 2:
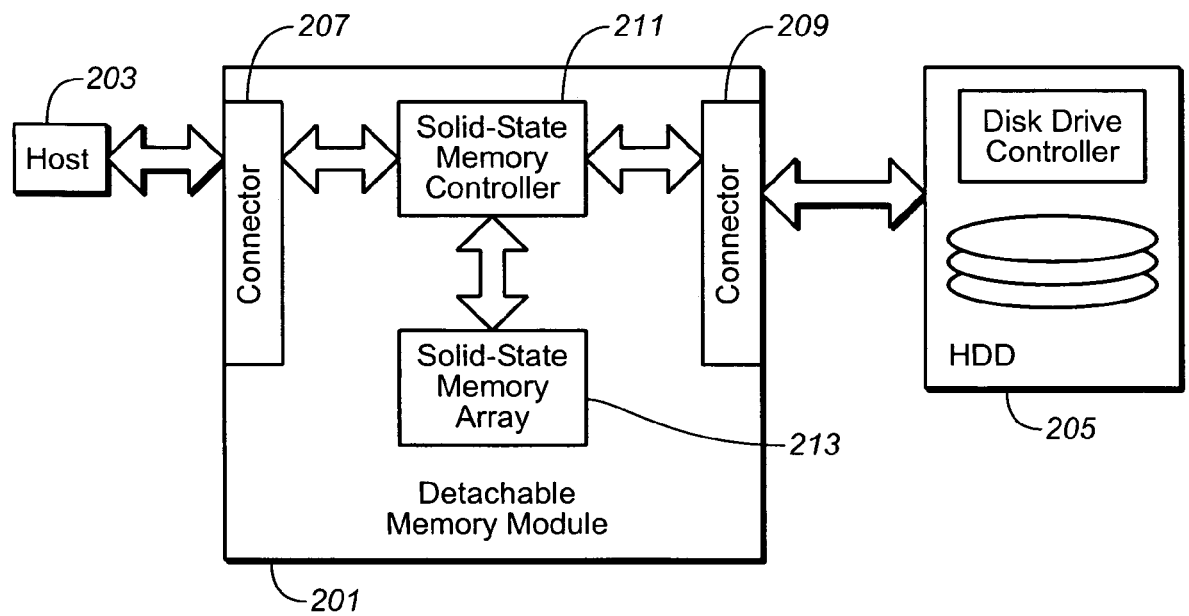
FIG. 2 shows a detachable memory module inserted between a host and a HDD according to an embodiment of the present invention.

FIG. 2 shows an embodiment of the present invention having a detachable memory module 201 connected between a host 203 and a HDD 205. Detachable memory module 201 may be inserted between host 203 and HDD 205 using standard connectors so that no hardware modification is needed. Detachable memory module 201 may be inserted in-line between the two devices by a user without any specialized equipment and without additionally configuring either host 203 or HDD 205. Thus, detachable memory module 201 may be considered a "plug and play" device. Because detachable memory module 201 has standard connectors 207, 209, it may be attached to any host system that uses such standard connectors. Similarly, detachable memory module 201 may be attached to any disk drive system using standard connectors. Examples of standards that may be used for the connectors of FIG. 3 include Universal Serial Bus (USB), SCSI, PCMCIA, Serial ATA, and IEEE1394 (Firewire). Such a detachable memory module may be inserted into a PC that has an internal HDD if there is sufficient space. Where an external HDD is used, detachable memory module 201 may simply be connected between the PC and the HDD. Detachable memory module 201 is designed to be transparent to host 203 so that no modification of host 203 is required. HDD 205 does not require any modification to work with detachable memory module 201 either. Thus, simply adding detachable memory module 201 upgrades the system with all necessary components being contained in detachable memory module 201.

Detachable memory module 201 is placed in-line between host 203 and HDD 205 so that communication between host 203 and HDD 205 passes through detachable memory module 201. Thus, a solid-state memory controller 211 may intercept any communication between host 203 and HDD 205. Memory controller 211 controls the flow of commands and data between host 203 and HDD 205 and also controls storage and retrieval of data in solid-state memory array 213. By adding the memory module in this location, the HDD performance may be improved without making any alterations to HDD 205.

Figure 3:
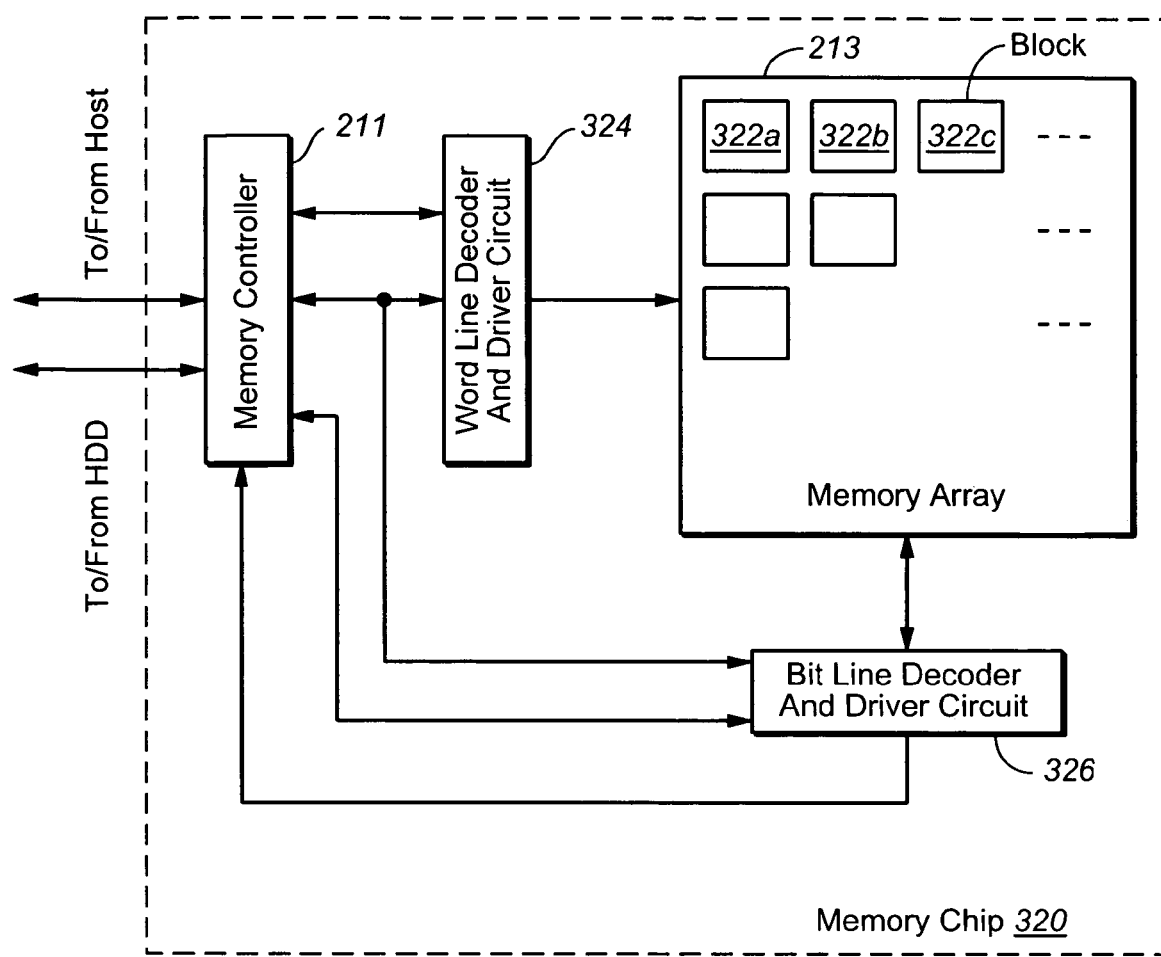
FIG. 3 shows a portion of the detachable memory module of FIG. 2 (the memory circuits) having both memory array and memory controller on a memory chip.

FIG. 3 shows part of detachable memory module 201 of FIG. 2 having both solid-state memory array 213 and memory controller 211 on the same memory chip 320. Memory array 213 is shown being comprised of multiple blocks 322a, 322b, 322c . . . of memory cells. Wordline and bitline decoder and driver circuits 324, 326 are used to access particular locations in memory array 213 under the control of memory controller 211. When a host write command is received from host 203, the data is stored in a location determined by memory controller 211. When a host read command is received from host 203, the location of the data is identified by memory controller 211 and is accessed using the word line and bit line decoder and driver circuits 324, 326. In other embodiments, memory controller 211 and memory array 213 may be on separate chips. Such separate chips may be mounted to a single printed circuit board so that they are physically close together. Additional interface circuits may be needed between the controller and connectors. Such circuits may be formed on the same substrate as the controller or may be separately formed.

Figure 4A:
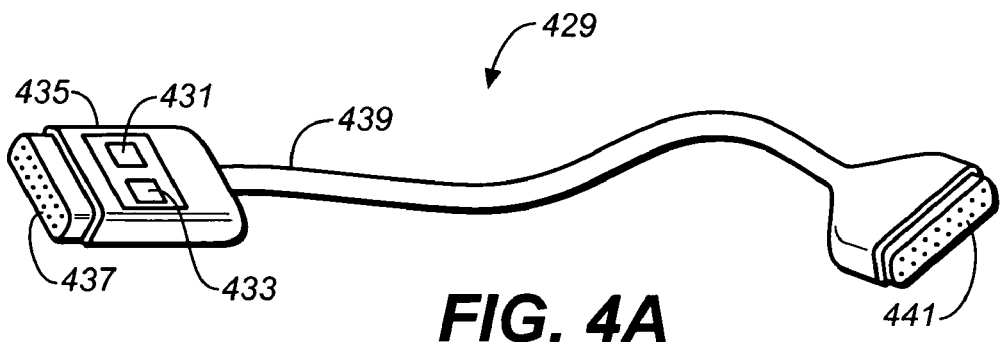
FIG. 4A shows a physical embodiment of the detachable memory module of FIG. 2 with cut-away view of the memory array and memory controller.

FIG. 4A shows detachable memory module 429 according to one physical embodiment of the present invention. In this example, memory array 431 and memory controller 433 are both located within a single housing 435 (shown in cut-away view) that also encloses connector 437 at one end of a cable 439. Another connector 441 is attached to the other end of cable 439. Detachable memory module 429 has the advantage that it may simply replace a similar cable that does not contain a memory array and a memory controller and may even have the same physical dimensions as the cable it replaces. Housing 435 may be the same or similar to the standard connector housing at the end of similar cables made of metal or plastic or other suitable materials. In other examples, housing 435 may be larger than the connector housing on the cable it replaces in order to accommodate memory array 431 and memory controller 435. Detachable memory module 429 is easy for an end-user to install. An existing cable connecting a HDD to a host may be removed and the cable of FIG. 4A inserted in its place. No additional configuration may be necessary. Alternatively, detachable memory module 429 may be connected as a dongle in series with a regular cable so that communication between the host and HDD passes through detachable memory module 429. The location of memory array 431 and memory controller 433 may be at either end of cable 439, the host end or the HDD end.

Figure 4B:
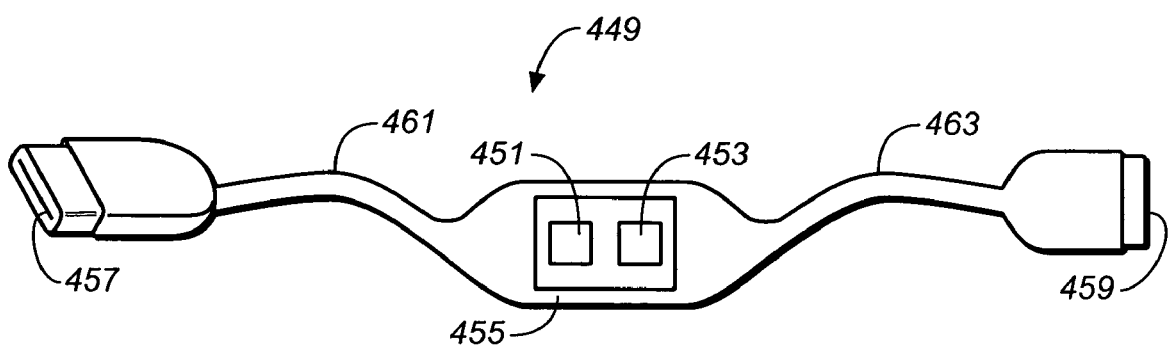
FIG. 4B shows another physical embodiment of the detachable memory module of FIG. 2 with cut-away view of the memory array and memory controller.

FIG. 4B shows a detachable memory module 449 according to an alternative physical embodiment of the present invention. In. this example a memory array 451 and memory controller 453 are located within a housing 455 at an intermediate point between a first connector 457 and a second connector 459. Housing 455 and connectors 457, 459 are connected by means of flexible cables 461, 463. Detachable memory module 449 may allow the addition of memory array 451 and memory controller 453 without increasing the size of housings for connectors 457, 459. This configuration may be advantageous where a connector housing has to meet a particular standard or where there is insufficient space for a larger housing at the point where either connector 457 or 459 is to be located. Using detachable memory module 449, the location of housing 455 containing memory array 451 and controller 453 may be varied so that detachable memory module 429 may be used even where there are tight space constraints.

Figure 4C:
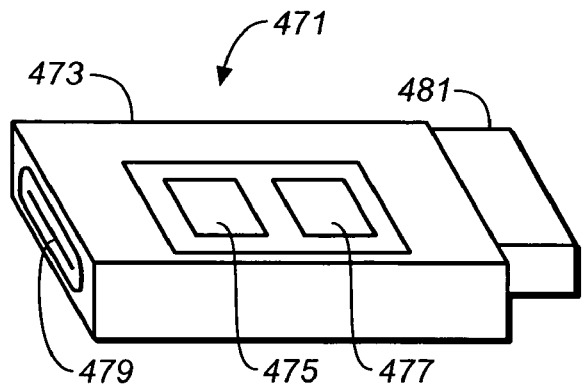
FIG. 4C shows another physical embodiment of the detachable memory module of FIG. 2 with cut-away view of the memory array and memory controller.

FIG. 4C shows a detachable memory module 471 according to an alternative physical embodiment of the present invention. FIG. 4C shows a single housing 473 that contains a memory array 475, controller 477 and connectors 479, 481. Housing 473 may be rigid and may be relatively small in size. Housing 473 may be used in combination with a cable to connect the host and HDD. In the example shown in FIG. 4C, connector 479 is a female connector while connector 481 is a male connector so that detachable memory module 471 may be inserted at a connection point between the host and the HDD.

The examples of FIGS. 4A-C show three possible physical configurations for the present invention. However, many more possibilities exist. In any of the examples shown, connectors in the same detachable memory module may be of the same type (e.g. both USB) or different types (e.g. SCSI and USB) with a memory controller converting signals between different standards. One connector may be male and the other female, or both connectors may be the same gender. The detachable memory module may be configured as two or more separable parts (for example, one part containing a memory array and one containing a controller). A detachable memory module may include a removable memory card that contains the solid-state memory array. In this way the detachable memory module may be easily upgraded by replacing the memory card with another memory card. Additional circuits may be included within a housing along with the memory array and controller. For example, one or more LEDs may be included to indicate operation of the module. A battery or other power source may be included. The housing may be rigid or somewhat flexible. In some examples, where the cable is sufficiently large, the housing may be within an outer covering of the cable itself so that the detachable memory module appears to be a standard cable.

Figure 5:
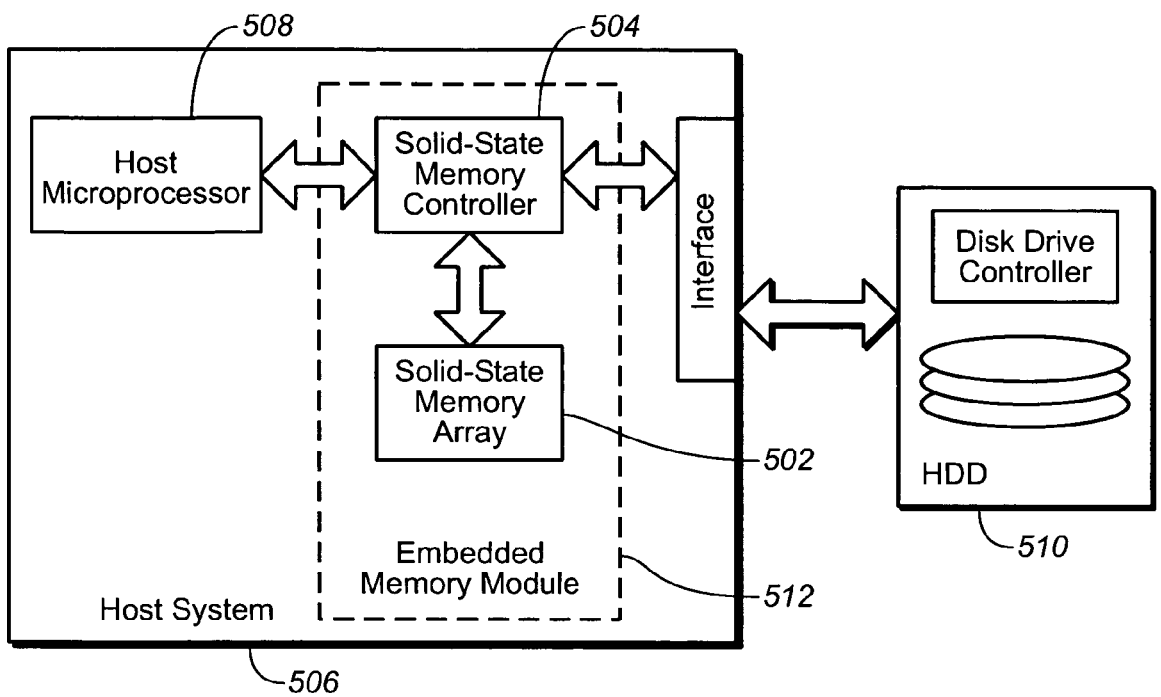
FIG. 5 shows an embedded memory module in a host system according to another embodiment of the present invention.

FIG. 5 shows yet another example of using solid-state non-volatile memory for improving HDD performance. In this example, a solid-state memory array 502 and a solid-state controller 504 are located within a host system 506. Solid-state memory controller 504 is positioned so that communication from a host microprocessor 508 to a HDD 510 passes through solid-state controller 504. Thus, solid-state memory controller 504 and solid-state memory array 502 may function in the same way as the examples shown in FIGS. 4A-4C, though the physical location is different. In one example, solid-state memory controller 504 and solid-state memory array 502 may be mounted to a motherboard in host system 506. For example, embedded memory module 512, comprising solid-state memory controller 504 and solid-state memory array 502, may be integrated with a particular chipset such as the Intel "South Bridge" chipset. This provides an embedded memory module to improve performance of HDD 510. Unlike the examples of FIGS. 4A-C, the example shown in FIG. 5 may require expert installation (or factory installation) instead of being easily added or removed by an end-user.

Functional Description

Memory modules (both detachable and embedded) provide several improvements in HDD performance when connected between a host and HDD. A memory module may allow a reduction in the amount of time that platters in the HDD spend actually spinning, so that power consumption is reduced. Mechanical wear is also reduced leading to improved reliability and longer lifetime. Overall speed of data storage may be improved by combining the strengths of HDD and solid-state memory. Various additional features may also be added to a system that has a solid-state memory, some of which are not available with a HDD alone. The improvements discussed below may be realized using a detachable memory module such as detachable memory module 201 of FIG. 2 or using an embedded memory module such as embedded memory module 512 FIG. 5 or other configurations.

Figure 6:
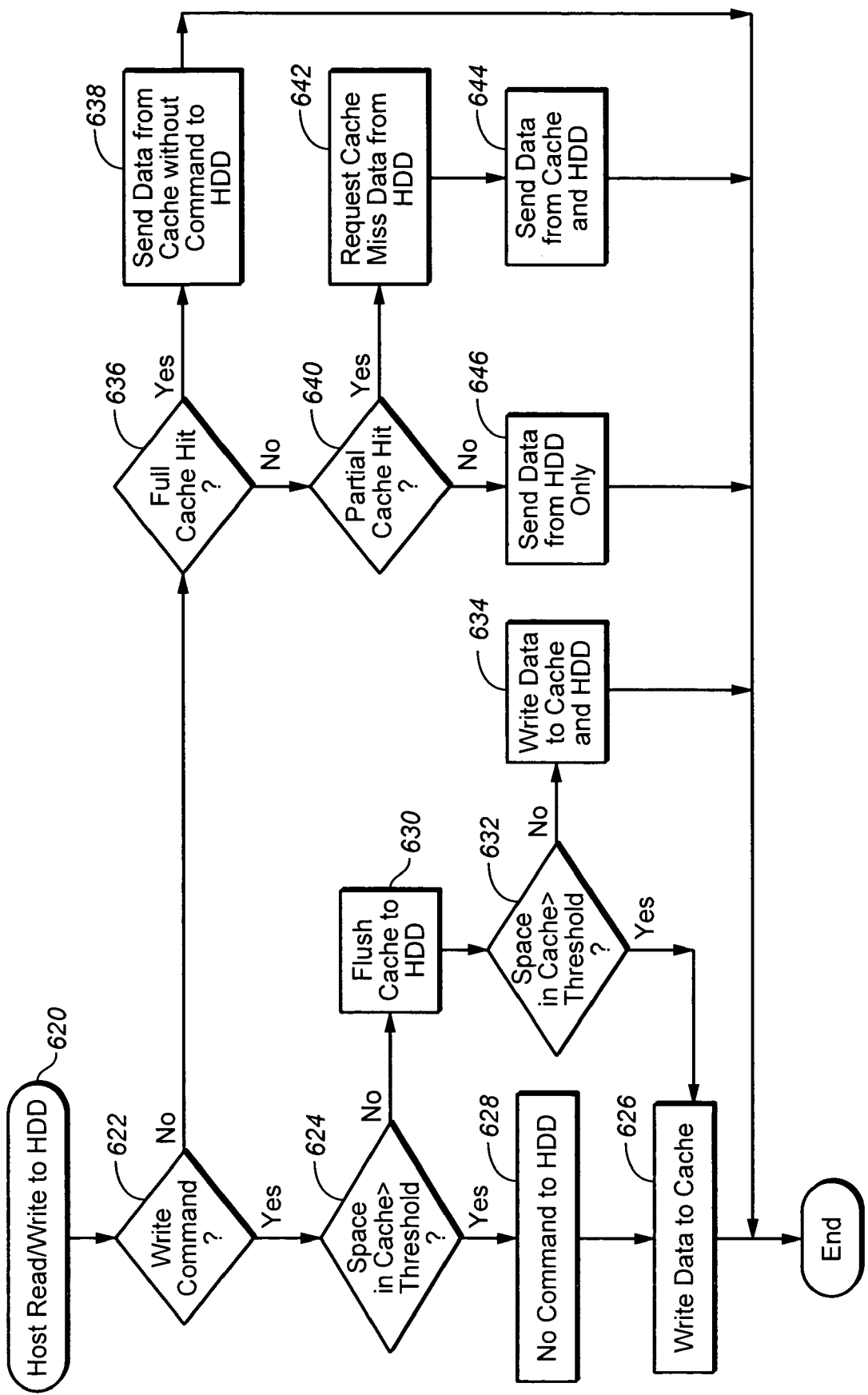
FIG. 6 shows operation of a memory module (as shown in FIG. 2 or 5) as a nonvolatile cache for the HDD.

FIG. 6 shows an example of a host read or write command to a HDD where a memory module is used to cache data between a host and a HDD. Data may be saved in the solid-state memory array under the control of the memory controller. The cache may consist of the entire solid-state nonvolatile memory array, or a portion of it. A command is sent from the host indicating data to be written to or read from the HDD. The command is received 620 by the memory controller and it is determined if it is a read or a write command 622. If it is a write command then it is determined if the space in the cache is sufficient to write the data 624. A threshold amount of space is determined from the amount of data to be written. The amount of space in the cache is compared with this threshold to see if it exceeds the threshold. The threshold amount of space may be the exact amount of space needed to store the data or may be somewhat greater so that the memory array does not become completely filled. If the space in the cache is greater than the threshold derived from the amount of data received, then the data is written to the cache 626. In this case, no data is saved to the HDD so there is no command sent to the HDD 628, and no other change in the condition of the HDD. Thus, if the HDD is in a power-saving condition, such as being spun down, it is unnecessary to spin-up the HDD or otherwise change the condition of the HDD. Considerable power may be saved by keeping the HDD in a spun-down state like this. Any relatively small amounts of data received from the host while the HDD is not spinning are stored in the cache memory and are only later written to the HDD. This may be done without notifying the host that the data is in cache and not in the HDD. The memory module may return a signal to the host as if the data was stored in the HDD. In fact, the operation of the cache may be completely transparent to the host so that the host operates as if only the HDD was present.

Where the amount of space in the cache is not greater than the threshold, the cache memory is flushed to HDD 630 to make room available in the cache. Then, if it is determined that there is sufficient space in the cache 632, the data is written to the cache 626. If there is still not enough space in the cache, then some data must be written to the HDD while some may be written to the cache 634. Alternatively, once the HDD is spun-up, it may be preferable to store all new data in the HDD in addition to the data from the solid-state memory so that the solid-state memory is emptied and a large amount of space remains available for storage of additional data.

When a read command is received, it is first determined if the data to be read is all stored in cache 636 ("full cache hit"). If the requested data is all in cache, then the data is sent from the cache to the host without any command being sent to the HDD 638. Thus, the HDD may remain in a spun-down condition or other power-saving condition. This may be done in a manner that is transparent to the host, so that the data appears to the host to come from the HDD. Where it is determined 640 that some, but not all of the requested data is in the cache, the additional data that is not in cache is requested from the HDD 642. The requested data from both the cache and HDD is then sent to the host under the control of the memory controller. Where none of the requested data is in the cache, all of the data must be sent from the HDD 646. Because the scheme of FIG. 6 keeps the HDD in a spun-down state in conditions where previously the HDD would be spun-up, power consumption is improved and reliability are improved and lifetime may be extended.

A powered-down state may mean more than simply spinning-down the HDD. Power may be turned off completely so that no power is used by the HDD. A HDD may be spun-down or otherwise put in a low-power condition in response to a command from the memory controller or after a predetermined period of inactivity. In another embodiment, a HDD may be disconnected from the host and the detachable memory module. The detachable memory module then caches data until the HDD is reconnected. A detachable memory module may also be used with other devices connected to a host, for example, a CD-ROM or other devices. In some applications, a detachable memory module may help to obtain improved speed or power consumption for peripheral devices by more efficiently using available bandwidth between the host and a particular device.

One aspect of a detachable memory module like detachable memory modules 429, 449 and 471 shown in FIGS. 4A-C is that they may be readily added or removed from a system. At certain times, the detachable memory module may contain data that is not saved to the HDD. In such cases, the host data is split between the detachable memory module and the HDD. If the detachable memory module is removed at this point, the data may not be available to the host. Therefore, there is generally a power-down routine where the data in the detachable memory module is copied to the HDD so that the HDD contains a complete copy of all host data that was to be stored. Where the detachable memory module and HDD lose communication without going through the power-down routine (e.g. sudden loss of power), the detachable memory module may go through a power-up routine when communication is restored. The power-up routine allows the detachable memory module to determine if it is still attached to the same HDD. If it is not connected to the same HDD, it may indicate an error condition to the host.

Figure 7:
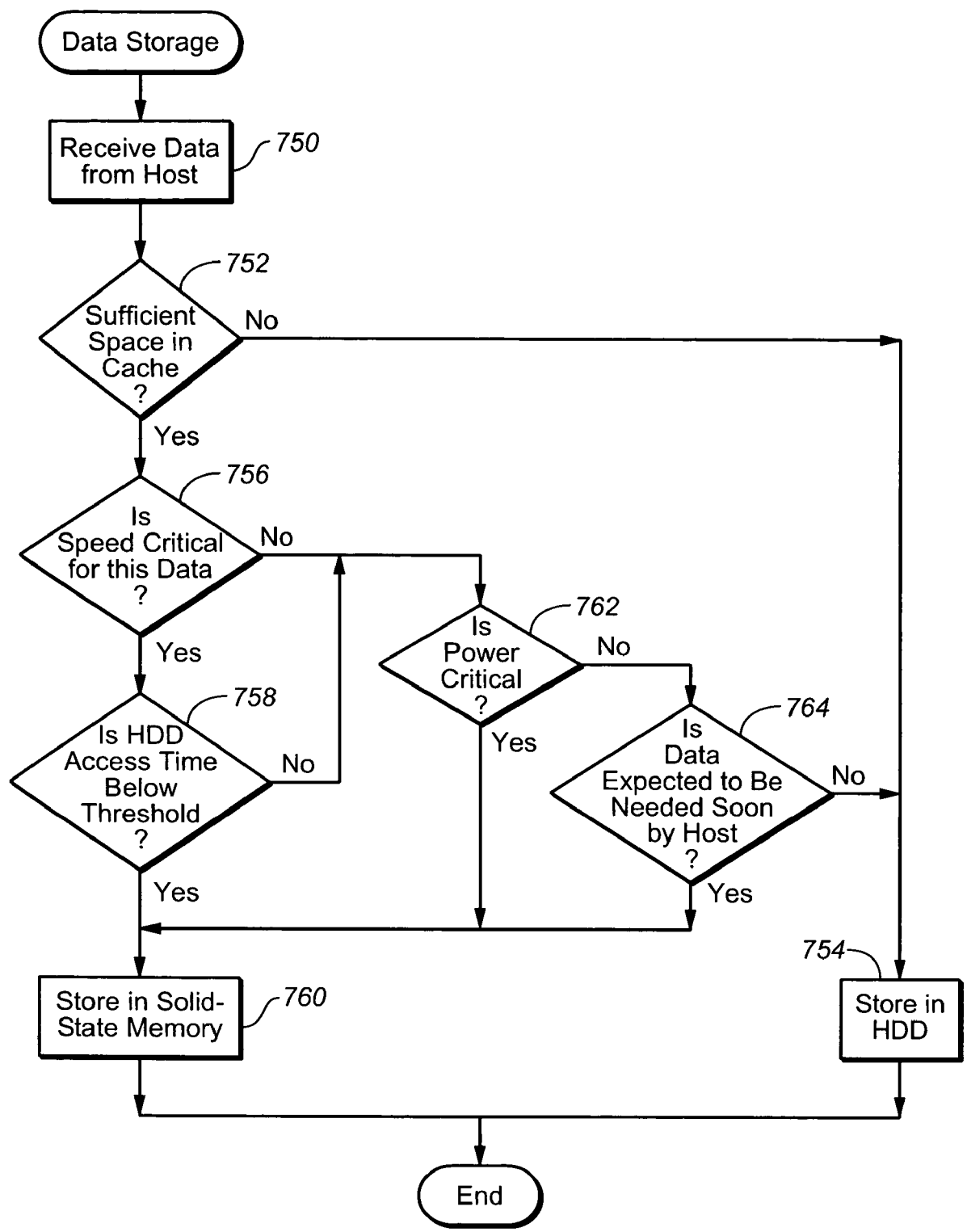
FIG. 7 shows operation of a memory module (as shown in FIG. 2 or 5) as a write cache, using multiple factors to select a data storage location for data received from a host.

FIG. 7 shows an alternative data storage scheme according to an embodiment of the present invention where a solid-state memory controller determines where to store data received from a host based on three different factors. The data is received 750 from the host by the memory module and it is then determined if there is sufficient space in cache to store the data 752. If there is not sufficient space in cache, the data is stored in the HDD 754. If there is sufficient space in the cache, it is determined if speed is critical for storing the data 756. This determination may be made by the solid-state memory controller based on information received from the host. For example, if the host is going to send additional data it may require high speed, but if no more data is to be sent by the host soon, speed may not be important. Alternatively, the controller may make this determination based on the nature of the data. If it is determined that speed is critical for the particular data, then the controller determines if the HDD access time is below a predetermined threshold 758. For example, if the HDD is spun-down or if the head is far away from the area to be written then the access time may fall below the threshold. The threshold may depend on the particular data to be stored and the host's speed requirements and the access time for the solid-state memory at that time. If the access time is below the threshold, then this means that the solid-state memory is significantly faster and therefore the data is stored in solid-state memory 760. However, if speed is not critical or if HDD speed is above the threshold (e.g. spun-up and head near location to be written) then additional factors are considered.

If power consumption is critical 762, then the solid-state memory is used 760. Power-consumption is of particular importance in portable electronic devices that depend on a finite source of power such as a battery. For example, power-consumption is generally important for laptop computers. However, if such a computer is plugged into an electrical outlet, power consumption is no longer important. Thus, the importance of power-consumption also changes over time even with the same host. Where a detachable memory module is used with multiple hosts, the importance of power-consumption will depend on the host. In some cases, a user may select a power-consumption preference for a host system (such as a laptop computer) that may be used to determine a caching policy in a memory module connected to the host system.

If power is not a critical factor, then it is determined if the data received from the host is expected to be needed again soon by the host 764. This determination may be made based on historical usage of data by the host, the nature of the data (e.g. FAT sectors may be frequently requested) or may be based on other factors. The term "soon" is a relative term and refers to how soon the data is expected to be needed compared with other data stored in the HDD and solid-state memory. Thus, data could be considered to be needed soon if it is to be needed before 90% of the stored data, even though this may not take place for several hours. Data might be considered not to be needed soon where 50% of the stored data is needed before it, even though this may take place in a matter of seconds. Where the data is expected to be needed soon, it. is stored in the solid-state memory 760. If the data is not expected to be needed soon, it is stored in the HDD 754.

The example of FIG. 7 shows that the destination for storage of data is determined based on three different factors: speed, power consumption and expected need for the data by the host. Additional factors may also be considered, including the condition of the solid-state memory. For example, the solid-state memory may be undergoing a garbage collection operation or may need to begin garbage collection soon. Scrub operations may be ongoing or may be needed. There may be few erased blocks in the solid-state memory so that additional blocks would have to be erased to store the received data, requiring significant time. Therefore, the threshold speed used to decide between the HDD and the solid-state memory may change according to the state of the solid-state memory. Speed of storage is affected by a number of factors that change frequently. Thus, even though the solid-state memory might be quicker to access on average, at any given time this may not be the case. Similarly, power-consumption requirements change from one time to another. Therefore, the algorithm shown in FIG. 7 may be repeated for each write command received from the host, or may be repeated multiple times for a portion of data corresponding to a single write command. The memory controller may switch between storing data in the HDD and the solid-state array multiple times in response to a single write command in order to more efficiently store the data and conserve power.

Host-Memory Communication

The above embodiments describe the form and operation of a memory module that may be implemented in a manner that is transparent to a host. This makes such memory modules backward compatible because no updating or modification of the host is needed. However, for some functions, additional commands may be used that are not part of the standard command set for host to HDD communication. Additional commands may be used between the host and memory module that do not correspond to commands to the HDD. The simplest memory module specific commands are read and write commands that are directed to the memory module and not the HDD. This means that the host requires that the data be read from or written to the memory module and not in the HDD. The host may do this because the data is going to be needed again soon or for some other reason. The solid-state memory may be partitioned with one partition used for caching as described above and other partitions used for other purposes.

Figure 8:
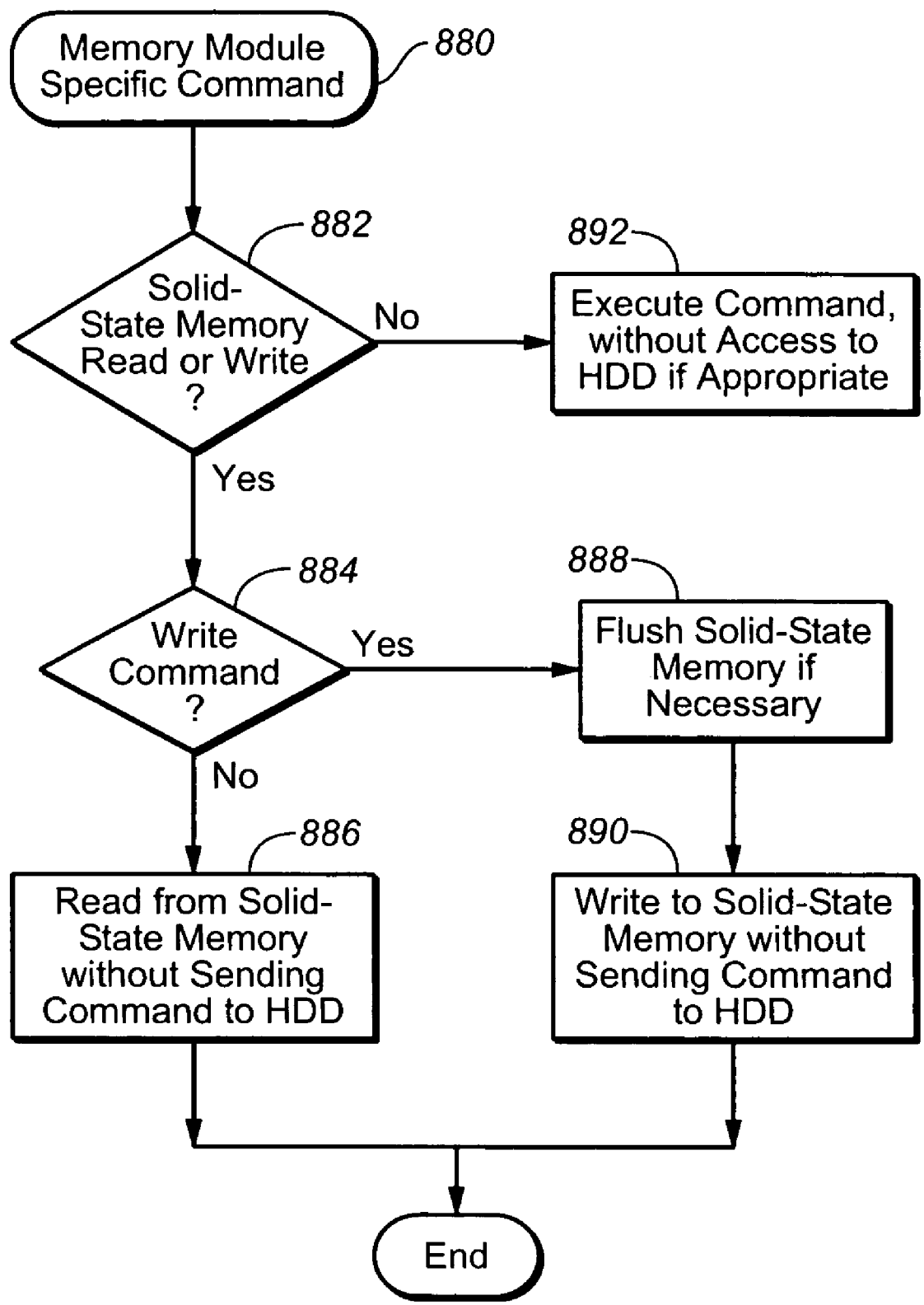
FIG. 8 shows operation of a memory module (as shown in FIG. 2 or 5) that receives memory module specific commands from a host.

FIG. 8 shows a flowchart of what occurs when a memory module receives a memory module specific command 880. If the command is a solid-state memory specific read or write command 882, then it is determined if the command is a write command or a read command 884. If the command is a read command, then the requested data is read from solid-state memory without sending the command to the HDD 886. Thus, the HDD may remain in a low-power state. If it is determined that the command is a solid-state memory specific write command 884, then the cache may be flushed if there is insufficient space to store the received data 889. This may include emptying one or more partitions and transferring their contents to the HDD. Otherwise, if there is sufficient space in the cache, data may be written to the cache without sending a command to the HDD 890.

In addition to memory module specific read and write commands, the host may send other commands that are specific to the memory module. Such commands may be executed without access to the HDD 892, or may involve access to the HDD in some cases. One such command is a host command that identifies data that may be used by the host for booting up. In general, it is desirable to boot up as fast as possible. However, the latency of HDDs adds to the time needed to boot up where boot data is stored in the HDD. If such boot data is stored in a solid-state memory, it may be accessed much faster. A host may determine that it will be powering-down soon and as part of a power-down routine the host may prepare for the next time it boots up. Any host data stored in solid-state memory may be flushed to the HDD to keep a complete copy of all data in one location. This is especially important where the memory module is detachable and may not be in place when the host boots up. Next, boot data may be copied to the solid-state memory. This data may be copied from the HDD according to the host's command. A copy may be kept in the HDD so that there are two copies of the boot data or, alternatively, the boot data may be kept only in the solid-state memory. The next time the host boots up it looks for the boot data in the solid-state memory and not in the HDD. In an alternative arrangement, only part of the boot data is stored in solid-state memory with the remainder being in the HDD. The portion of boot data in the solid-state memory is sufficient to allow the host to begin booting up while the HDD spins-up. The HDD then sends the remainder of the boot data. In this way, the latency associated with spinning up a HDD is overcome without having to store all the boot data in the solid-state memory.

Additional memory module specific commands may concern security features implemented in the memory module. The nonvolatile memory array may be partitioned with one or more portions of the array dedicated to storage of secure data or content keys. The solid-state memory controller may encrypt or decrypt data stored in either the solid-state memory or the HDD in response to host commands. Such protective measures may be part of a Digital Rights Management (DRM) scheme to protect material that is under copyright or is to be protected for other reasons. By implementing DRM using a memory module, the contents of a HDD may be protected without modifying the HDD. A DRM scheme used with nonvolatile memory is further described in the following U.S. Patent Applications: Publication No. 2004/0039932, entitled, "Apparatus, system and method for securing digital documents in a digital appliance," filed on Aug. 23, 2002; Publication No 2005/0138551, entitled "Method for page translation," filed on Oct. 1, 2004; and Ser. No. 11/050,013, entitled, "Protection of Digital Data Content," filed on Feb. 3, 2004. Examples of security systems that may be implemented using a memory module include Content Protection for Recordable Media (CPRM), SanDisk Secure Content Solution (SSCS), Windows Media Digital Rights Management (WMDRM) and U3. The memory module can manage the encryption and storage of data from a host in the HDD. Normally, such encrypted data occupies a different amount of space than the same data in an unencrypted form. The memory module may include memory management functions to deal with this. Examples of memory management systems that may be used are described in detail in the following U.S. patent applications Ser. No. 11/060,249, entitled, "Direct Data File Storage in Flash Memories"; Ser. No. 11/060,174, entitled, "Direct File Data Programming and Deletion in Flash Memories"; Ser. No. 11/060,248, entitled, "Direct Data File Storage Implementation Techniques in Flash Memories,"all filed on Feb. 16, 2005; and No. 60/705, 388, entitled, "Direct Data File Storage in Flash Memories," filed on Aug. 3, 2005. These four applications are referred to as "Direct Data File Storage" applications. The memory module may also provide data compression prior to storage of host data in the HDD so that the space in the HDD is used efficiently. The memory module may act as key to a particular HDD so that the data in the HDD is not accessible without the memory module. Alternatively, the memory module may contain a software key that is transferable to another unit.

A memory module may also be used to allow a host using one data management scheme to store data in a HDD that has a different data management scheme. For example, most HDDs use a data management scheme where data is managed in addressable units of sectors that have individual logical addresses. Physical locations where sectors are stored are recorded so that they may later be accessed. The host keeps track of which sectors correspond to a particular file using a File Allocation Table (FAT). Data is frequently fragmented in such a logical system, with data from a particular file stored in a number of spaced-apart areas of the HDD. Certain schemes for storing host data files directly have been described for use in mass storage applications. For example, the Direct Data File Storage applications referenced above describe such schemes. Direct file storage schemes may involve a host interface that sends a host file with a file identifier. The host does not need to maintain a FAT in such systems. However, such a direct file storage scheme may not be compatible with legacy HDDs using logical addressing schemes. One solution to the problem of incompatibility of a host using a direct file storage system and a HDD that is configured for a logically addressed data is to insert a memory module between the host and HDD where the memory module translates between the two management schemes. In one example, the host sends files to the memory module, the files having a file identifier. The memory module then maps portions of the file to sectors of a standard size having logical addresses and sends the sectors to the HDD for storage. The memory module may record the logical addresses of sectors allocated to a particular file in a FAT. When a read request is received from the host identifying a particular file, the memory module consults the FAT to determine the logical addresses of the sectors for that file. The memory module then requests the sectors from the HDD using the logical addresses obtained from the FAT. Thus, the memory module acts as a translator or adapter between the host and the HDD. U.S. patent application Ser. No. 11/196,826, entitled, "Mass data storage system," filed on Aug. 3, 2005 gives additional examples of such translation. The memory module may also act as a buffer that stores data temporarily before it is stored in the HDD. Buffered data may be analyzed by the memory controller so that it is efficiently stored in the HDD.

Special commands may also be used to select the caching policy to be implemented by the memory module. For example, a host may choose a particular policy based on the type of data to be stored, or the expected need to read that data. The caching policy may be changed according to the host's needs. If a detachable memory module is removed from one host and attached to another host, a new caching policy may be implemented. For example, the host may communicate to the memory module that power-consumption is important or unimportant depending on whether the host is running from an electrical outlet or battery. The memory module may then implement a caching policy that reflects the importance of power-consumption by reducing the time the HDD is spun-up. Host commands may also tell the memory module whether particular data is expected to be needed again soon or not and whether speed of writing data is critical.

Special commands may also be used to initiate communication between the memory module and the host. A handshake routine may be conducted when the memory module is inserted in a host. The memory module may determine from the handshake routine whether the host is capable of particular functions (such as memory module specific commands, DRM functions, boot data identification). The memory module can also determine whether the host will send logically addressed data or data identified by file. An additional handshake routine may be performed when a HDD is connected to the memory module. The memory module may determine data transfer speeds and may be able to establish the time required to spin up the HDD and the time required to access data in the HDD under different conditions.

Although various aspects of the present invention have been described with respect to particular embodiments, it will be understood that the invention is entitled to protection within the full scope of the appended claims.

The invention claimed is:

1. A detachable memory module for connecting between a host system and a disk drive system, comprising:
    a first input/output connector for connecting to the host system, the first input/output connector conforming to a first bus standard;
    a second input/output connector for connecting to the disk drive system, the second input/output connector conforming to a second bus standard;
    a nonvolatile memory array contained within a removable memory card;
    a controller connected to the nonvolatile memory array and interposed between the first input/output connector and the second input/output connector to intercept communication between the first and second input/output connectors, the controller converting signals between the first bus standard and the second bus standard, the controller determining which host data to store in the disk drive and which host data to store in the nonvolatile memory array based on power requirement or a combination of speed and power requirements, the controller receiving commands from the host system including at least one of (a) a command that concerns a key that is stored in the nonvolatile memory array but is not stored in the disk drive system, the key being associated with encrypted data that is stored in the primary bulk storage memory system (b) a command that identifies data according to a unique file identifier that corresponds to logical addresses that are not specific to a file (c) a command that identifies a cache policy to be implemented by the nonvolatile memory array; and a housing that encloses the nonvolatile memory array and the controller.

2. The detachable memory module of claim 1 wherein the disk drive system is connected to the second input/output connector, the controller determines locations for storage of data in the nonvolatile memory array or in the disk drive system, a first portion of data being stored in the nonvolatile memory array and not in the disk drive system, a second portion of data being stored in both the nonvolatile memory array and the disk drive system.

3. The detachable memory module of claim 1 wherein the housing is rigid and the housing encloses the first input/output connector and the second input/output connector.

4. The detachable memory module of claim 1 wherein the housing encloses one of the first or second input/output connectors, the other connector being connected to the housing by a cable.

5. The detachable memory module of claim 1 wherein both the first and second input/output connectors are external to the housing and are connected to the housing by cables.

6. The detachable memory module of claim 1 wherein the nonvolatile memory away comprises a plurality of memory cells, an individual memory cell storing two or more bits of data.

7. The detachable memory module of claim 1 wherein the first and second bus standards are each a different one of the following standards: USB, PCMCIA, Serial-ATA and Firewire.

8. The detachable memory module of claim 1 further comprising one or more LEDs that indicate operation of the detachable memory module.

9. The detachable memory module of claim 1 wherein the controller is configured to indicate an error condition to the host system if, during a power-up routine, the detachable memory module detects that the disk drive system is not a disk drive system to which the detachable memory module was previously connected.

10. A memory system implemented in a host system for control of a disk drive connected to the host system, comprising:

a solid-state non-volatile memory array;

a controller connected to the solid-state nonvolatile memory array, the controller managing storage of data in the solid-state nonvolatile memory array, the controller intercepting communication from a host microprocessor to the disk drive and determining which host data to store in the disk drive and which host data to store in the solid-state nonvolatile memory array based on power requirement or a combination of speed and power requirements, the controller converting signals between a first bus standard and a second bus standard, the controller receiving commands from the host system including at least one of (a) a command that concerns a key that is stored in the solid-state non-volatile memory array but is not stored in the disk drive, the key being associated with encrypted data that is stored in the disk drive (b) a command that identifies data according to a unique file identifier that corresponds to logical addresses that are not specific to a file (c) a command that identifies a cache policy to be implemented by the solid state non-volatile memory array;

the controller and the solid-state memory array mounted on a printed circuit board; and the printed circuit board contained within a housing that also contains the host microprocessor.

11. The memory system of claim 10 wherein the printed circuit board is the motherboard of the host system.

12. The memory system of claim 10 wherein the host microprocessor is also mounted on the printed circuit board.

13. The memory system of claim 10 wherein the controller determines which host data to store in the disk drive and which host data to store in the solid-state nonvolatile memory array based on power requirements, wherein the importance of power-consumption is communicated by the host to the memory system and in response a caching policy is selected by the controller from a plurality of caching policies.

14. The memory system of claim 13 wherein the plurality of caching policies includes a first caching policy that reflects high importance of power-consumption, and a second caching policy that reflects low importance of power-consumption, the first caching policy selected in response to a first communication from the host when the host is running from a battery, the second caching policy selected in response to a second communication from the host when the host is running from an electrical outlet.

15. The detachable memory module of claim 10 wherein the controller determines which host data to store in the disk drive and which host data to store in the solid-state nonvolatile memory array based on a combination of speed and power requirements with speed being compared every time an access is required by the host system.

16. A memory module removably interposed between a host system and a primary bulk storage memory system in a manner that is not transparent to the host, comprising:

a first connector connected to the host system;

a second connector connected to the primary bulk storage memory system;

a nonvolatile memory array;

a controller that is in communication with the host system through the first connector, with the primary memory system through the second connector and with the nonvolatile memory array, the controller converting signals between first and second bus standards, the controller determining which host data to store in the primary bulk storage memory system and which host data to store in the nonvolatile memory array based on rower requirements or a combination of speed and power requirements, the controller intercepting a first command from the host to the primary bulk storage memory system and the controller determining whether to access the primary bulk storage memory or the nonvolatile memory array in response to the first command, the controller receiving a second command from the host to the memory module, the second command directed to the memory module and not the primary bulk storage memory system as a result of a determination by the host to access the memory module and not the primary bulk storage memory system, wherein the second command is one of (a) a command that concerns a key that is stored in the nonvolatile memory array but is not stored in the disk drive system, the key being associated with encrypted data that is stored in the primary bulk storage memory system (b) a command that identifies data according to a unique file identifier that corresponds to logical addresses that are not specific to a file (c) a command that identifies a cache policy to be implemented by the nonvolatile memory array.

17. A memory module removably interposed between a host system and a primary bulk storage memory system in a manner that is not transparent to the host, comprising:
- a first connector connected to the host system;
- a second connector connected to the primary bulk storage memory system;
- a nonvolatile memory array;
- a controller that is in communication with the host system through the first connector, with the primary memory system through the second connector and with the nonvolatile memory array, the controller converting signals between first and second bus standards, the controller determining which host data to store in the primary bulk storage memory system and which host data to store in the nonvolatile memory array based on rower requirements or a combination of speed and power requirements, the controller intercepting a first command from the host to the primary bulk storage memory system and the controller determining whether to access the primary bulk storage memory or the nonvolatile memory array in response to the first command, the controller receiving a second command from the host to the memory module, the second command directed to the memory module and not the primary bulk storage memory system as a result of a determination by the host to access the memory module and not the primary bulk storage memory system wherein the second command is one of (a) a command that concerns a key that is stored in the nonvolatile memory array but is not stored in the disk drive system, the key being associated with encrypted data that is stored in the primary bulk storage memory system (b) a command that identifies data according to a unique file identifier that corresponds to logical addresses that are not specific to a file (c) a command that identifies a cache policy to be implemented by the nonvolatile memory array.

18. The memory module of claim 17 wherein the unique file identifier is translated by the controller into a plurality of logical addresses of sectors stored in the primary bulk storage memory system, using a File Allocation Table that is maintained by the controller, and in response the sectors are read from the primary bulk storage memory system.

19. A memory module removably interposed between a host system and a primary bulk storage memory system in a manner that is not transparent to the host, comprising:
- a first connector connected to the host system;
- a second connector connected to the primary bulk storage memory system;
- a nonvolatile memory array;
- a controller that is in communication with the host system through the first connector, with the primary memory system through the second connector and with the nonvolatile memory array, the controller converting signals between first and second bus standards, the controller determining which host data to store in the primary bulk storage memory system and which host data to store in the nonvolatile memory array based on power requirements or a combination of speed and power requirements, the controller intercepting a first command from the host to the primary bulk storage memory system and the controller determining whether to access the primary bulk storage memory or the nonvolatile memory array in response to the first command, the controller receiving a second command from the host to the memory module, the second command directed to the memory module and not the primary bulk storage memory system as a result of a determination by the host to access the memory module and not the primary bulk storage memory system wherein the second command is one of (a) a command that concerns a key that is stored in the nonvolatile memory array but is not stored in the disk drive system, the key being associated with encrypted data that is stored in the primary bulk storage memory system (b) a command that identifies data according to a unique file identifier that corresponds to logical addresses that are not specific to a file (c) a command that identifies a cache policy to be implemented by the nonvolatile memory array.

* * * * *